Oct. 11, 1966  R. B. PATTEN ETAL  3,278,846
APPARATUS FOR SAMPLING ELECTRIC WAVES
Filed May 3, 1962                                                5 Sheets-Sheet 1

INVENTORS
Robert B. Patten
Joseph W. Sedlmeyer
Lewis Fussell Jr.

BY *Cadwallader And Kelly*

ATTORNEYS

Oct. 11, 1966     R. B. PATTEN ET AL     3,278,846
APPARATUS FOR SAMPLING ELECTRIC WAVES
Filed May 3, 1962                          5 Sheets-Sheet 2

INVENTORS
Robert B. Patten
Joseph W. Sedlmeyer
Lewis Fussell Jr.

BY *Cadwallader And Kelly*

ATTORNEYS

Oct. 11, 1966 R. B. PATTEN ETAL 3,278,846
APPARATUS FOR SAMPLING ELECTRIC WAVES
Filed May 3, 1962 5 Sheets-Sheet 3

INVENTORS
Robert B. Patten
Joseph W. Sedlmeyer
Lewis Fussell Jr.

BY Cadwallader And Kelly

ATTORNEYS

INVENTORS
Robert B. Patten
Joseph W. Sedlmeyer
Lewis Fussell Jr.

BY *Cadwallader And Kelly*

ATTORNEYS

Oct. 11, 1966  R. B. PATTEN ETAL  3,278,846
APPARATUS FOR SAMPLING ELECTRIC WAVES
Filed May 3, 1962  5 Sheets-Sheet 5

INVENTORS
Robert B. Patten
Joseph W. Sedlmeyer
Lewis Fussell, Jr.

BY Cadwallader And Kelly

ATTORNEYS

United States Patent Office

3,278,846
Patented Oct. 11, 1966

3,278,846
APPARATUS FOR SAMPLING ELECTRIC WAVES
Robert B. Patten, Joseph W. Sedlmeyer, and Lewis Fussell, Jr., Las Vegas, Nev., assignors to Edgerton, Germeshausen & Grier, Inc., Boston, Mass., a corporation of Massachusetts
Filed May 3, 1962, Ser. No. 193,067
10 Claims. (Cl. 324—77)

This invention relates to electric wave analysis and more particularly to systems for analyzing very fast complex electric waves. The invention described herein was made in the course of, or under, Contract AT(29–1)–1183 with the U.S. Atomic Energy Commission.

Prior art limitations

The study of complex electric waves has traditionally been conducted by means of oscilloscopes, the presentations of which may be photographed to create a permanent record for analysis in as much detail as may be required. However for many problems, the time delays, caused by the necessity of developing the film and measuring the record have become intolerable, particularly when a large number of electric waves must be examined. Furthermore, as the requirements grow for the study of very fast electric waves calling for time resolutions measured in nanoseconds, oscilloscopes become increasingly complex and costly, and their maintenance problems become severe.

For these reasons a number of electric wave analyzers have been devised, which determined, for example, the frequency spectrum of the electric wave components, or other parameters descriptive of the particular electric wave. Some of these analyzers incorporate computers, or may be connected with existing computer equipment, to reduce the raw data rapidly and automatically.

Sampling techniques are also employed with oscilloscopes, to aid in the analysis of electric waves too rapid and too complex to be handled by means of analyzers. But this method is limited to the study of a series of repeating electric waves; such equipment extracts a single piece of information from each electric wave and the pieces are reassembled or analyzed separately. To date, however, there has been no technique available to replace or supplement the oscilloscope for the study of non-recurring fast transient electric waves.

Summary of the invention

To overcome the foregoing limitations, we have devised a novel, distinctive and useful system for electric wave analysis. Although our invention may be utilized to analyze electric waves ranging from D.C. to ultra high frequencies, and repetitive, uniform, nonuniform or single transient electric waves, its most economical usefulness lies in the analysis of very fast complex electric waves. In summary our invention provides means for sampling the electric wave at a number of selected points along the waveform to produce sample voltages that represent the instantaneous amplitude of said electric wave at said points. One may adjust the time intervals between these points independently down to less than one nanosecond. One may make these time intervals all equal or program them non-linearly, with jitter of less than 0.1 nanosecond. In one embodient, sampling occurs at said time intervals with respect to real time while in another embodiment sampling occurs instantaneously with respect to real time, but at said time intervals with respect to the electric wave being sampled. Further, a circuit which retains the voltage amplitude stretches each sample voltage. A time-stretch by a factor of $10^8$ has been realized, with good stability. Other equipment may communicate and transmit said stretched sample voltages over open-wire to low-frequency recording systems; conventional equipment may convert them to digital form for rapid data-processing; and/or they may be presented visually. Moreover, with the accurately known time intervals and the stretched sample voltages, one may accurately reconstruct the original electric wave on an extended time base. The speed of response of the two embodiments is extremely fast, being limited only by diode characteristics.

Advantages of the Invention

Accordingly, compared with high-speed oscilloscopy, the invention is highly useful in rapidly performing a large number of individual analyses of fast single transient electric waves. Such a requirement exists particularly in investigations of fluctuations in the response of systems, or for production-testing of components. The invention is also advantageous when the data-analysis must be accomplished quickly after the occurrence of the event that produced the electric wave; it is not necessary to waste time developing films and reading them. The invention is also useful where the analysis-computation center is located remotely from the event producing the electric wave because the sampled data can be directly transmitted to said center.

There are many applications of the invention in the nuclear field. Fluctuation studies of reactors and subcritical assemblies may be carried out rapidly by pulsed neutron techniques. The build-up and decay characteristics of detectors may be determined, together with analysis of statistical fluctuations of a large number of individual pulses. The pulse shape of the radiation wave from nuclear devices may be measured. Neutron-spectrometry using the time-of-flight method may be facilitated. Isometric studies involving half-lives in the range 10–1,000 nanoseconds, together with scattering investigations may be carried out quickly and precisely.

Objects of the invention

It is, therefore, an object of this invention to provide a new, useful and novel system for analyzing electric waves. It is particularly useful in the analysis of a single fast complex electric wave, such as, for example, one having a time duration less than one microsecond.

Another object is to provide a system for sampling electric waves at a remote location and transmitting the results to a center for further processing.

Still a further object is to provide a new and novel system that will quickly analyze a large number of varying single transient electric waves within a relatively short period of time. Accordingly the statistical fluctuations thereof may be analyzed utilizing existing computer technology.

Another object is to provide a novel system for determining the variation between a predetermined electric wave and one or more other electric waves.

A further object is to provide a system for analyzing any single electric wave having a complex wave shape regardless of its time duration.

Other and further objects will become apparent upon careful perusal of the description and appended claims together with the following drawings in which:

*Principle of the invention*

Figure 1:
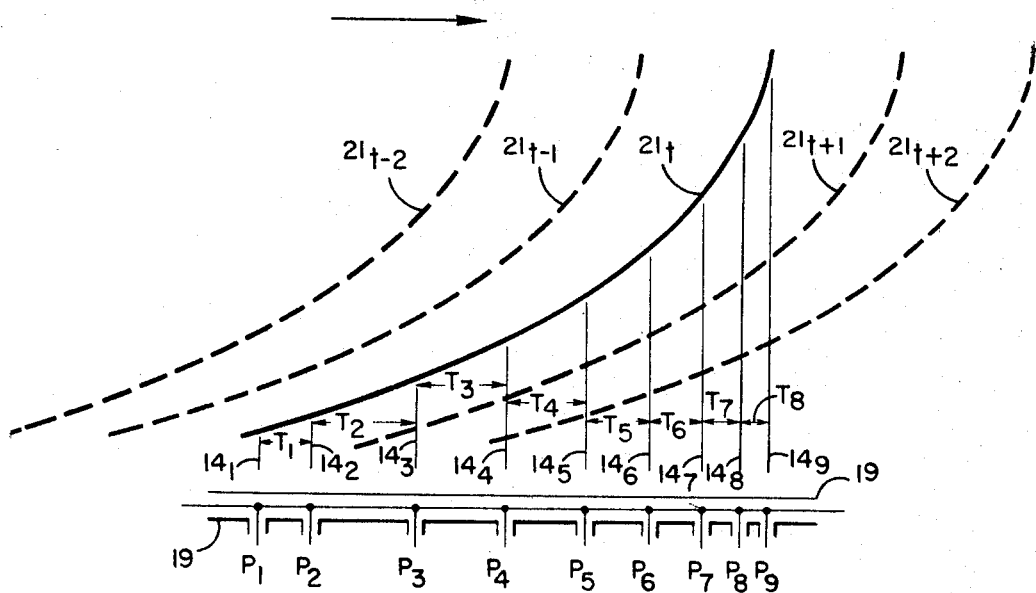
FIGURE 1 presents graphs which are useful in explaining the basic principle underlying the present invention.

FIGURE 1 illustrates schematically arbitrary electric wave 21 propagating in the direction of the arrow through coaxial cable 19. Electric wave 21 takes a finite time, herein called "time duration," to propagate past a sampling point $P_1$ in cable 19 because it has a finite velocity of propagation therethrough. Reference characters $21_{t-2}$, $21_{t-1}$, $21_t$, $21_{t+1}$, and $21_{t+2}$ designate schematically the positions of electric wave 21 in cable 19 at real times $t-2$, $t-1$, $t$, $t+1$ and $t+2$ respectively. A plurality of sampling point $P_1$ through $P_9$ connect to cable 19 at equal distances or at distances programmed into a nonlinear sequence. These distances are equivalent to time intervals $T_1$ through $T_8$ with respect to electric wave 21.

Simultaneous sampling at points $P_1$ through $P_9$ at time $t$ produces sample voltages $14_1$ through $14_9$ which represent the amplitudes of electric wave 21 at said sampling points at time $t$.

With respect to real time, extraction of sample voltages $14_1$ through $14_9$ occurs simultaneously at time $t$. However, with respect to the time duration of electric wave 21, extraction occurs at times which define time intervals $T_1$ through $T_8$.

Figure 2:
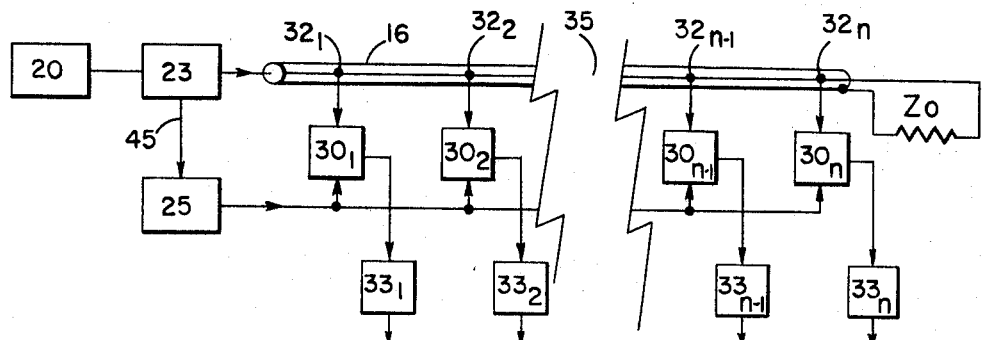
FIGURE 2 is a block diagram of one embodiment of the invention.

*Embodiment of FIGURE 2*

FIGURE 2 presents a block diagram of apparatus designed to accomplish the foregoing. In this diagram suitable transmission media, such as coaxial cables and matched connectors, constitute the connections between component circuits. The input electric wave from source 20 appears first at matched trigger tap-off 23 where a small portion is extracted for use in triggering gate generator 25 (which may be a typical gate generator well known in the art) by way of delay cable 45. Matched trigger tap-offs 23 are also known in the art as, and are hereby defined to include, two-way matching pads (see FIG. 4.5(a), p. 122, volume 5, Millimicrosecond pulse techniques, second edition, 1959, by I.A.D. Lewis and F. H. Wells, published by Pergamon Press); transmission line potential dividers (see FIG. 4.24(a), p. 161, volume 5, Millimicrosecond pulse techniques); and the resistive power dividers and signal samplers sold by Microlab, 570 West Mount Pleasant Ave., Livingston, N.J. The remainder of the electric wave continues along sampling coaxial cable 16, which is ultimately terminated in its characteristic impedance $Z_0$. A plurality of matched T-connectors $32_1$ to $32_n$ connect to cable 16. T-connectors 32 are connected at equal distances and therefore, equal time intervals, assuming cable 16 is uniform) along cable 16 as illustrated in FIGURE 2. If desired, the distances (and therefore, time intervals) may be programmed into a non-linear sequence. Note that broken space 35 indicates the omission of a number of T-connectors and other components to simplify the illustration and discussion. A detector circuit 30 connects to each T-connector 32, as illustrated. The outputs of detector circuits $30_1$ through $30_n$ connect to stretch circuits $33_1$ through $33_n$ respectively. Detector circuit 30 and stretch circuit 33 will be described more completely hereinafter.

By appropriate timing (for example, by making delay cable 45 the appropriate length) the small portion of the electric wave may be made to trigger gate generator 25, generating a gating pulse at the instant when the electric wave is entirely within sampling cable 16; the same gating pulse will then enable all detector circuits 30 along cable 16 to sample said electric wave at said points at the same instant. The outputs of detector circuits 30 are sample voltages that represent the instantaneous amplitudes of the electric wave at the times selected with respect to the electric wave. Stretch circuits 33 stretch these outputs by retaining the voltage amplitudes by a time-stretch factor as great as $10^8$, with good stability. For example, a sample voltage having an amplitude of 3 volts with a time duration of 10 nanoseconds may be stretched in time to 1 second retaining 3 volts amplitude during such time.

*Principle of modification*

Appropriate modification of the embodiment of FIGURE 2 permits sampling at times selected with respect both to real time and to the input electric wave. Thus, FIGURES 3A through 3J illustrate successive positions of arbitrary electric wave 21 as it propagates past T-connector 32 located at only one point on coaxial sampling cable 16. Subscripts A through J designate electric wave 21 at these positions. Extracted sample voltages 14 for these positions represent the amplitudes of electric wave 21 at T-connector 32 and therefore at corresponding times along electric wave 21. These times relate both to real time and to the input electric wave.

Figure 4:
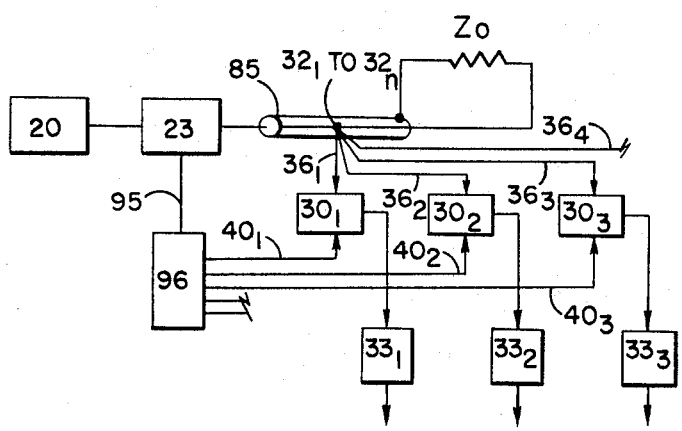
FIGURE 4 is a block diagram of another embodiment of the invention.
Figure 3A:
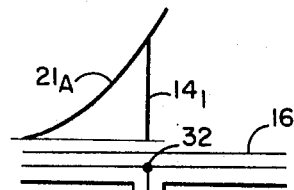
FIGURES 3A to 3J present graphs that are useful in explaining the embodiment illustrated in FIGURE 4.
Figure 3F:
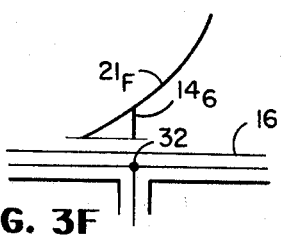
Figure 3B:
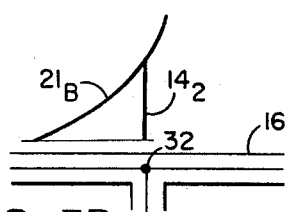
Figure 3G:
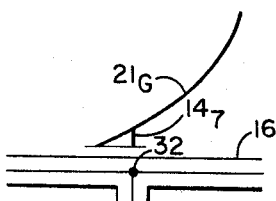
Figure 3C:
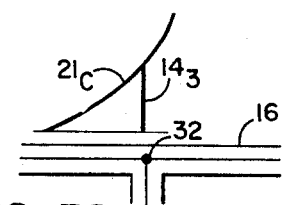
Figure 3H:
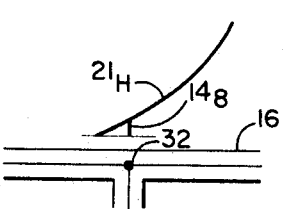
Figure 3D:
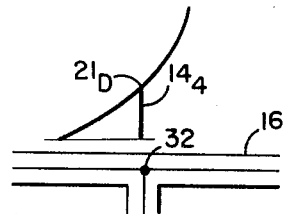
Figure 3I:
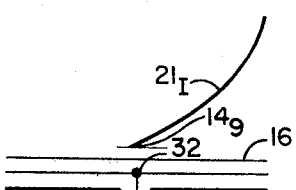
Figure 3E:
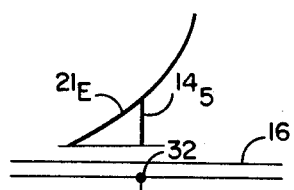
Figure 3J:
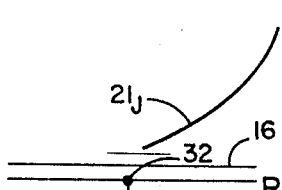

*Embodiment of FIGURE 4*

FIGURE 4 illustrates one embodiment for accomplishing this wherein a plurality of T-connectors $32_1$ through $32_n$ are connected at one point on coaxial cable 85. A suitable transmission medium, such as coaxial cable 36, connects each such T-connector to a corresponding detector circuit 30. A delay line 40, such as a coaxial cable cut to a specific time length, connects each detector circuit 30 to gate generator 96, which may be a typical gate generator producing a plurality of simultaneous gating pulses. Obviously one may substitute a tapped artificial line for the plurality of delay cables 40. Again, a transmission medium channels the output of each detector circuit 30 to a corresponding stretch circuit 33, as illustrated. The connections between gate generator 96, matched trigger tap-off 23 and source 20 are the same as in FIGURE 2, except that cable 95 need not be used as a delay cable. Accordingly, gating pulses, selectively delayed, enable detector circuits 30 to sample the electric wave at selected times, the time intervals between which may be made equal or programmed into a non-linear time sequence according to some mathematical function, such as a geometric or logarithmic function. The outputs of detector circuits 30 are sample voltages that represent the instantaneous amplitudes of the electric wave at T-connectors 32 at said selected times. These times relate both to real time and to the input electric wave. Stretch circuits 33 stretch these sample voltages as heretofore explained.

*Detector circuit*

Figure 5:
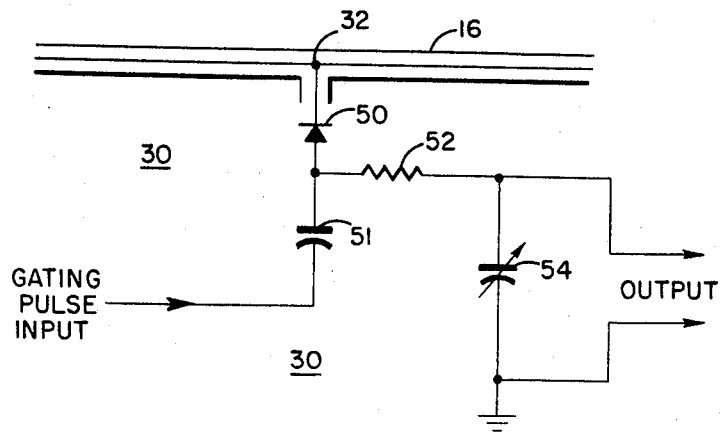
FIGURE 5 is a schematic diagram of the detector circuit that is used in the embodiments of FIGURES 2 and 4.

Since successful operation of the above embodiments depends to a great degree upon a detector circuit 30 that has a minimum distorting effect on the electric wave being analyzed, it is in order to describe such a detector circuit 30. FIGURE 5 presents a schematic diagram of detector circuit 30. Obviously one designs the coupling circuits to prevent detector circuits 30 from overloading the gate generator output. If there is no electric wave on sampling cable 16 at T-connector 32 when the gate generator is triggered, diode 50 conducts until the positive gating voltage appears dropped across condenser 51. Condenser 51 charges to nearly the peak gating voltage; it discharges only through the back resistance of diode 50 and the loading presented by the input impedance of stretch circuit 33. Since all detector circuits 30 receive the same gating voltage, all capacitors 51 charge to the same voltage level. This voltage amplitude represents absence of an electric wave, or base line.

Next, assume a positive electric wave at T-connector 32 and a positive gate pulse of greater amplitude than that of the electric wave. The positive electric wave present at T-connector 32 back biases diode 50 and reduces the gating voltage drop across condenser 51 by the voltage amplitude of the electric wave. In effect, the electric wave modulates the gating pulse. One hundred percent modulation represents zero volts out of detector circuit 30 and zero percent modulation represents a detector circuit output equal to the maximum gating voltage amplitude. The modulation depth is determined by the amplitude of the gating pulse and the voltage below which diodes 50 become non-linear. The back resistance of diode 50 pre-stretches the modulated gating pulse. This pre-stretched pulse passes through isolation resistor 52 to stretch circuit 33. Note that the self-capacitance of diode 50 is the only loading imposed on sampling cable 16 before application of the gating pulse. This causes a very minor mis-match and negligible signal distortion.

It will be apparent to those skilled in the art that sampling cable 16 may be biased positive, or polarities may be reversed, if desired, to sample negative electric waves.

Stretch Circuit

Figure 6:
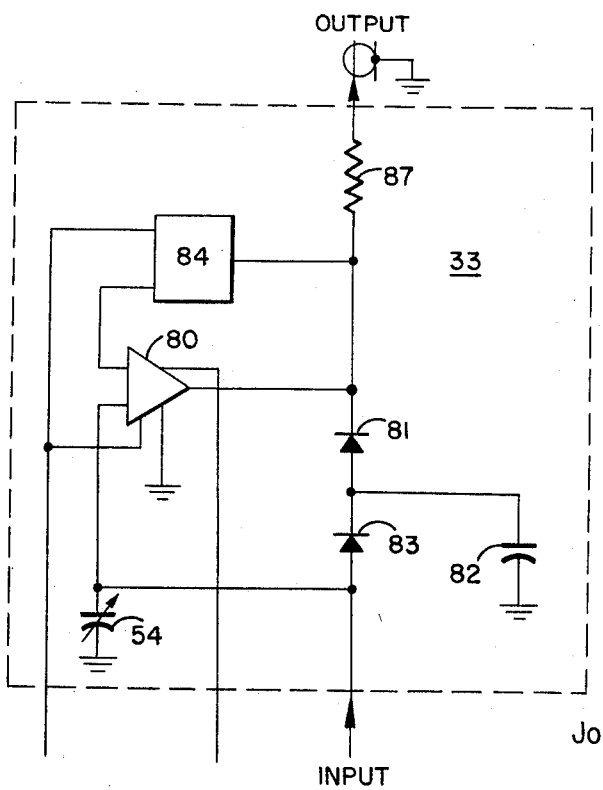
FIGURE 6 is a schematic diagram of the stretch circuit that is used in the embodiments of FIGURES 2 and 4.

Since stretch circuit 33 also is highly important in utilizing the above embodiments, it will now be described. Refer to FIGURE 6. Stretch circuit 33 comprises difference amplifier 80 operating with degenerative feedback loop 84 for stability and regenerative feedback including diode 83 for time stretch. Open loop gain of difference amplifier 80 approaches 10,000, and degeneration reduces system gain to unity. The pre-stretched pulse from detector circuit 30 charges the input capacity of the stretch circuit. This includes small trimmer capacitor 54 placed at the input of each difference amplifier to compensate for differences in stray capacitances between the plurality of stretch circuits 33. The output current from difference amplifier 80 charges capacitor 82 through diode 81. Charged capacitor 82 acts as a current source to keep the small input capacity charged through diode 83. Since the open loop gain of difference amplifier 80 is finite, the stretch time is not infinite. However, the amplitude of the output voltage is held equal to the amplitude of the input voltage for one second with less than one percent droop.

Example

Figure 7:
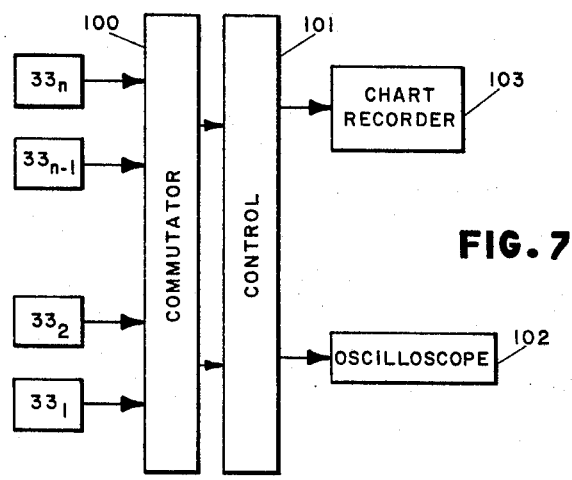
FIGURE 7 is a block diagram illustrating apparatus for pictorially presenting the outputs of the embodiments of FIGURES 2 and 4.
Figure 8:
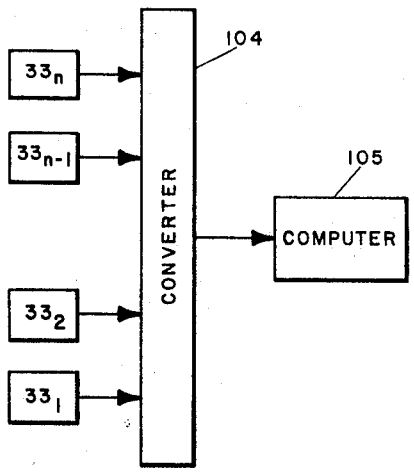
FIGURE 8 is a block diagram illustrating apparatus for processing the outputs of FIGURES 2 and 4.

Using the embodiment of FIGURE 2 we have extracted sample voltages 14 within the time duration of the gating pulse which was less than 10 nanoseconds. Detectors circuits 30 pre-stretched these sample voltages 14 to about one microsecond. Stretch circuits 33 then stretched them to more than ten seconds during which time commutation occurred. Clearing the stretch circuits took place thereafter. The electric waves sampled ranged from 200 nanoseconds to one microsecond time duration. It is therefore obvious that one can use the present invention to analyze rapidly a single transient electric wave or large numbers of them. Further, the commutated outputs can be stored and then be transmitted at any desired speed over low-frequency tranmission media to a central location. Thus, as stated heretofore, the outputs of stretch circuits 33 may be commutated by commutator 100, as illustrated in FIGURE 7. Control 101 may then pictorially present the commutated outputs on oscilloscope 102 or chart recorder 103 in the form desired. Further, as stated heretofore, the outputs of stretch circuits 33 may be converted to suitable digital form by converter 104 and the digital forms may then be processed by a computer 105 as illustrated in FIGURE 8.

Variations

We now point out some of the variations of the principles and features of the present invention. Others will easily occur to those skilled in the art.

First, one observes that the embodiments of FIGURES 2 and 4 may be combined. Thus, the output gating voltages of gate generator 96 of FIGURE 4 connect to detector circuits 30 of FIGURE 2 by way of delay lines 40 of FIGURE 4. This combination provides greater flexibility. It is particularly useful when T-connectors 32 of FIGURE 2 are connected to related events occuring at different widely-spaced locations.

Second, the system may be arranged to gate only one detector circuit 30 on and off according to a predetermined timed sequence. Moreover, synchronization and further gating permits each detector circuit output to be accepted and operated on by one and only one selected stretch circuit of a plurality of stretch circuits.

Last, detector circuits 30 may be impedance programmed for a particular known electric wave. If such electric wave is sampled, the impedance program assures that the outputs of detector circuits 30 all have equal amplitudes and that the outputs of stretch circuits 33 have equal amplitudes. Any variation from the known electric wave is immediately apparent because the amplitudes of the variation change from normal.

Conclusion

While specific embodiments have been disclosed, other modifications will occur to those skilled in the art. All such are considered to lie within the true spirit and scope of the invention as hereinafter defined in the appended claims.

What is claimed is:
1. Apparatus to sample an electric wave that comprises:
   a transmission medium through which said electric wave may be transmitted;
   a plurality of detecting circuits connected to a common point in said transmission medium, each adapted to produce, when enabled, an output pulse representing the amplitude of said electric wave at said common point; and
   means adapted to enable said detecting circuits in a sequence of predetermined times while said electric wave propagates within said transmission medium past said point.
2. Apparatus as in claim 1 further comprising a plurality of circuits, one each connected to the output of each detecting circuit, all adapted to hold substantially constant the amplitude of said output pulses for a substantial period of time.
3. Apparatus to sample an electric wave that comprises:
   a transmission medium through which said electric wave may be transmitted;
   a plurality of detecting circuits, each connected to a point in said transmission medium and adapted to produce, when enabled, an output pulse representing the amplitude of said electric wave at said point; and
   means comprising gate circuitry connected to said detecting circuits and adapted to enable said detecting circuits in a sequence fo predetermined times while said electric wave is propagating within said transmission medium.
4. Apparatus to sample an electric wave that comprises:
   a transmission medium through which said electric wave may be transmitted;
   a plurality of detecting circuits connected to said transmission medium at points located at spaced intervals along said transmission medium and adapted to produce, when enabled, output pulses representing the amplitudes of said electric wave at said points; and
   means comprising gate circuitry connected to said de- tecting circuits and adapted to enable said detecting circuits in a sequence of predetermined times with respect to real time while said electric wave is propagating within said transmission medium.

5. Apparatus to sample an electric wave that comprises:
a transmission medium through which said electric wave may be transmitted;
a plurality of detecting circuits connected to a common point in said transmission medium, each adapted to produce, when enabled, an output pulse representing the amplitude of said electric wave at said common point; and
means comprising gate circuitry connected to said detecting circuits and adapted to enable said detecting circuits to produce a plurality of said output pulses while said electric wave is propagating within said transmission medium.

6. Apparatus to sample an electric wave as in claim 5 in which said gate circuitry is adapted to enable said detecting circuits in a sequence of predetermined times with respect to real time.

7. Apparatus to sample an electric wave as in claim 6 in which the time intervals between said predetermined times vary according to a predetermined function.

8. Apparatus to sample an electric wave as in claim 7 in which said function is logarithmic.

9. Apparatus to sample an electric wave as in claim 5 further comprising a plurality of circuits, one each connected to the output of each detecting circuit, all adapted to hold substantially constant the amplitude of said output pulses for a substantial period of time.

10. Apparatus to sample an electric wave emanating from a source that comprises:
a transmission medium through which said electric wave may be transmitted;
a plurality of detecting circuits connected to points located at spaced intervals along said transmission medium and adapted to produce, when enabled, a plurality of output pulses representing the amplitudes of said electric wave at said points; and
means comprising
gate circuitry connected to said detecting circuits and adapted to enable said detecting circuits, and
a matched trigger tap-off connected to the source of said electric wave, said gate circuitry and said transmission medium and adapted to permit said electric wave to enable said gate circuitry and to transmit the same to said transmission medium.

References Cited by the Examiner

UNITED STATES PATENTS

| | | | |
|---|---|---|---|
| 2,516,888 | 8/1950 | Levy | 328—55 X |
| 2,877,413 | 3/1959 | Muehlner | 324—68 |
| 2,912,601 | 11/1959 | Slatten. | |
| 2,927,969 | 3/1960 | Miller | 179—15.55 |
| 2,928,901 | 3/1960 | Bogert | 179—15.55 |
| 3,034,048 | 5/1962 | Rogers | 324—56 X |
| 3,038,069 | 6/1962 | Tuller | 324—77 X |
| 3,068,405 | 12/1962 | Glazer et al. | 324—68 |
| 3,071,732 | 1/1963 | Martin | 328—56 X |

OTHER REFERENCES

The Review of Scientific Instruments (I), vol. 18, No. 7, July 1947, pp. 488–495, "The Measurement of Ultra-Short Time Intervals."

The Review of Scientific Instruments (II), vol. 20, No. 3, March 1949, pp. 197–201, "A Simplified Chronotron Type Timing Circuit."

WALTER L. CARLSON, *Primary Examiner.*

A. E. RICHMOND, *Assistant Examiner.*